United States Patent [19]

Matsuda

[11] Patent Number: 4,914,736

[45] Date of Patent: Apr. 3, 1990

[54] LIQUID JET RECORDING HEAD HAVING MULTIPLE LIQUID CHAMBERS ON A SINGLE SUBSTRATE

[75] Inventor: Hiroto Matsuda, Ebina, Japan

[73] Assignee: Canon Kabushiki Kaisha, Tokyo, Japan

[21] Appl. No.: 361,772

[22] Filed: May 30, 1989

Related U.S. Application Data

[63] Continuation of Ser. No. 082,917, Aug. 10, 1987, abandoned, which is a continuation of Ser. No. 747,564, Jun. 21, 1985, abandoned.

[30] Foreign Application Priority Data

Jul. 5, 1984 [JP] Japan ................................ 59-139421

[51] Int. Cl.[4] .......................... G01D 15/16; B41J 3/04

[52] U.S. Cl. .................................. 346/140 R; 358/75

[58] Field of Search ........................ 346/140; 358/75

[56] References Cited

U.S. PATENT DOCUMENTS

| | | | |
|---|---|---|---|
| 4,330,787 | 5/1982 | Sato | 346/140 R |
| 4,376,945 | 3/1983 | Hara | 346/140 |
| 4,380,771 | 4/1983 | Takatori | 346/140 R |
| 4,463,359 | 7/1984 | Axata | 346/140 |
| 4,479,134 | 10/1984 | Kawanabe | 346/140 R |
| 4,490,728 | 12/1984 | Vaught | 346/140 X |
| 4,611,219 | 9/1986 | Sugitani et al. | 346/140 R |

FOREIGN PATENT DOCUMENTS

| | | |
|---|---|---|
| 2944005 | 5/1980 | Fed. Rep. of Germany . |
| 3012552 | 9/1980 | Fed. Rep. of Germany . |
| 3012698 | 3/1981 | Fed. Rep. of Germany . |
| 2115748A | 9/1983 | United Kingdom . |

*Primary Examiner*—Joseph W. Hartary

*Attorney, Agent, or Firm*—Fitzpatrick, Cella, Harper & Scinto

[57] ABSTRACT

A liquid jet recording apparatus comprising: liquid chambers communicating with a plurality of discharge orifices for discharging a recording liquid to form flying liquid droplets for accommodating the recording liquid; and heat generating elements for generating energy used for forming the flying liquid droplets, wherein a plurality of element groups, each of which includes a plurality of said heat generating elements on the same substrate are respectively and independently provided, and each liquid chamber is independently provided in each of the element groups.

12 Claims, 1 Drawing Sheet

LIQUID JET RECORDING HEAD HAVING MULTIPLE LIQUID CHAMBERS ON A SINGLE SUBSTRATE

This application is a continuation of application Ser. No. 07/082,917 filed Aug. 10, 1987, now abandoned, which is a continuation of application Ser. No. 06/747,564, filed June 21, 1985, now abandoned.

BACKGROUND OF THE INVENTION

1. Field of the Invention

This invention relates to a liquid jet recording head by which liquid is jetted to form flying liquid droplets for recording.

2. Description of the Prior Art

Ink jet recording methods (liquid jet recording methods) have recently drawn public attention because noise caused by recording is negligibly small, high speed recording is possible and recording can be effected on plain paper without any special treatment such as fixation.

Among them, liquid jet recording methods disclosed in Japanese Patent Application Laid-open No. 51837/1979, German Laid-open (DOLS) No. 2843064, U.S. Pat. No. 4,330,787 and U.S. Pat. No. 4,490,728 are different from other liquid jet recording methods in that thermal energy is applied to liquid to produce a driving power for discharging liquid droplets.

That is, according to the recording methods disclosed in the above-mentioned references, the liquid is subjected to heat energy which changes its state by abruptly increasing its volume. The resulting force due to the state change jets the liquid through an orifice at the tip of the recording head portion to form flying droplets which attach to a receiving member to effect recording.

In particular, the liquid jet recording method disclosed in the DOLS 2843064 can be very effectively applied in a so-called "drop-on demand" recording method and further more, can be easily used for recording heads of a full line type and a high density multi-orifice type. Thus, images of high resolution and high quality can be obtained at a high speed.

An on-demand type recording method refers to a recording method in which, upon forming recording images, droplets necessary for forming images are discharged in response to input signals. According to this method, there is no necessity of recovering and recirculating the ink. A continuous type recording method, where ink droplets are continuously discharged, (some ink droplets are used for recording and some are not, dependening on the images to be recorded) needs such recovery and recirculation of ink. Therefore, the on-demand type rcording apparatus is more suitable for miniaturizing and simplifying the apparatus than the continuous type recording. The full line type method refers to a method wherein orifices are arranged along the full recording width of a record receiving (member such as paper), and therefore, the full line type need not scan in the direction of paper width by the recording head. Thus, the full line type is suitable for increasing the recording speed as well as miniaturizing and simplifying the apparatus. In the full line type recording apparatus, for example, in the case of recording the full width of A-4 size paper (210 mm) with 8 orifices per 1 mm, 1680 orifices are continuously arranged resulting in a high density multi-orifice apparatus.

The recording head portions of an apparatus used in the above-mentioned recording method comprises a liquid discharging portion constituted of orifices and liquid flow paths communicating with the orifices and having heat actuating portions applying thermal energy for discharging liquid droplets to liquid, and electrothermal transducers for generating thermal energy.

Such a recording head may be constituted of a plurality of orifices arranged in line. Liquid flow paths communicating with respective orifices communicate with a common liquid chamber, and liquid may be fed to the liquid chamber from a liquid tank.

According to conventional color recording methods, that is, recording two or more colors, recording heads corresponding to each color are, in general, arranged depending upon the necessary number of colors, and ink is fed to the respective heads from an ink tank.

That is, in the case of recording two colors, e.g. red and black, there is used a recording head for red ink and a recording head for black ink. In the case of recording four or more colors, at least one recording head for each color, e.g. yellow, magenta, cyan and black is usually used. Color recording according to such a method has an advantage in that it is sufficient to only arrange recording heads of the same structure corresponding to the number of the necessary color. However, upon arranging two or more recording heads, high accuracy is required with respect to the relative positions of the recording heads. In order to meet such requisite, highly accurate processing is disadvantageously required for fabricating the recording heads and fixing devices for the recording heads.

The demand for recording color images of high resolution and high quality has been recently increasing to a great extent. The above-mentioned methods, where a plurality of recording heads are arranged, can not sufficiently satisfy the demand. High accuracy as to the position of recording dot on a receiving paper is required so that a particular processing of the recording head and fixing device should be contrived. As a result, the manufacturing cost becomes inevitably very high. Further, it is not easy to exchange the recording head since a severe adjustment of position is necessary.

In addition, when recording heads corresponding to the number of colors are so arranged, as the number of colors increases, the total volume of the recording head becomes so large that the recording head is difficult to apply to a small and compact printer. In addition, the total weight of the head increases. As a result, the running system of a carriage carrying such a head for recording is disadvantageously heavily loaded.

SUMMARY OF THE INVENTION

An object of the present invention is to provide a recording head free from the above-mentioned drawbacks.

Another object of the present invention is to provide a recording head capable of easily effecting color and graduation recordings of high quality and high resolution and further of low cost and small and compact size.

It is futher object of the present invention to provide a liquid jet recording apparatus comprising liquid chambers communicating with a plurality of discharge orifices for discharging a recording liquid to form flying liquid droplets for accommodating said recording liquid and heat generating elements for generating energy used for forming said flying liquid droplets characterized in that a plurality of element groups, each of which includes a plurality of said heat generating elements on the same substrate are respectively and independently provided and a liquid chamber is independently provided in each of said element groups.

DETAILED DESCRIPTION OF THE PREFERRED EMBODIMENT

Figure 1:
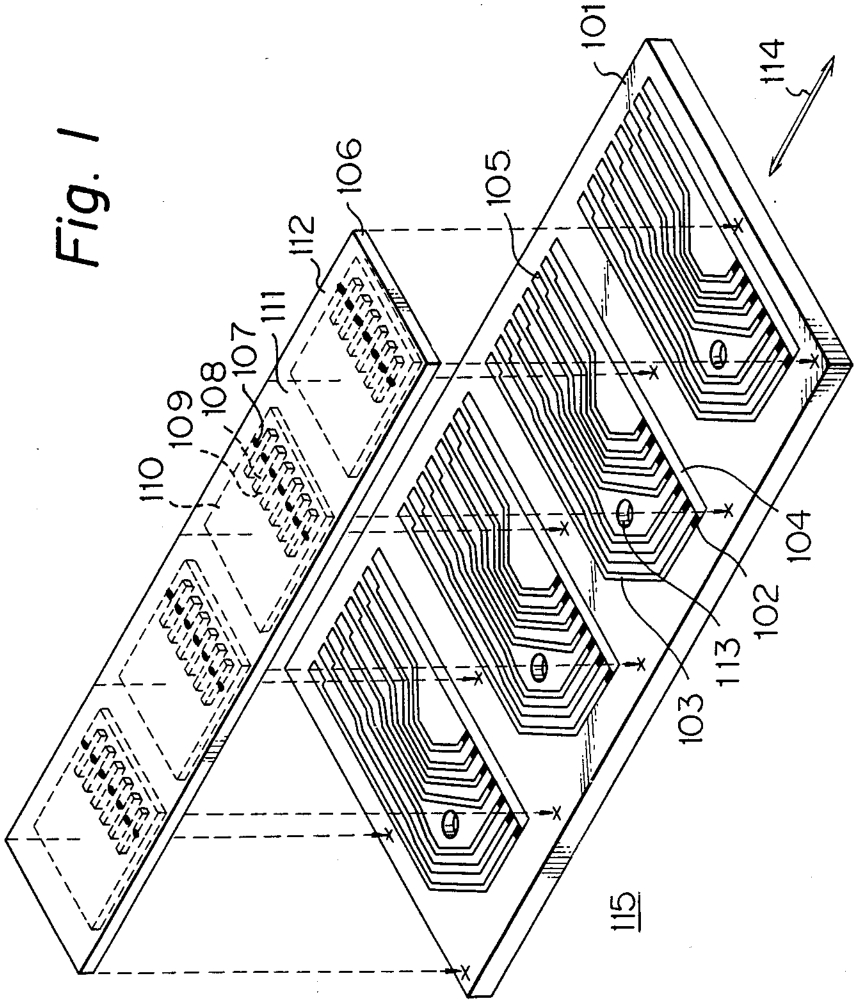
FIG. 1 is an exploded oblique view of an embodiment of a recording head of the present invention.

Now the present invention will be explained in greater detail.

The foregoing objects can be achieved, according to the present invention, by an integral recording head comprising:

a liquid discharge portion, including plural recording-liquid discharge orifices for forming flying-liquid droplets by discharging recording liquids, and thermal acting portions communicating with the orifices, such that the thermal energy acts on the liquid; and an electro-thermal conversion member, in which heat generating portions thereof are formed between at least one pair of electrodes electrically connected to a heat generating resistive layer formed on a supporting member, wherein plural thermal acting portions and respectively corresponding orifices are formed on a single supporting member in plural groups, each of which is associated with a common liquid chamber communicating with the orifices of said group, and wherein the liquid chamber of these groups are mutually separated so as to avoid liquid mixing between different groups, thereby enabling separate discharge of two or more liquids.

The present invention provides an extremely compact recording head capable of multi-color and variable density recordings of a high image quality and a high resolution power at a low cost and in an easy manner. Plural groups of heat generating elements and respectively corresponding groups of orifices are formed on a supporting member and inks are introduced to the groups of orifices from different inlets without mixing of inks. In the conventional method of using two or more recording heads for multi-color recording, each head and mounting element requires particular designing with precise dimensions for mutual alignment of the orifices so that a high power is achieved at the sacrifice of a very high cost and is still associated with a certain limitation. On the other hand, the present invention can easily provide, at a very low cost, a recording head capable of fine image recording, because the groups of heat generating elements and of orifices are formed in one step respectively on a substrate and a plate, thus ensuring a very high positional precision and a high orifice density. Also, the recording head of the present invention is very small and light as the orifice groups corresponding to different colors are formed on a single substrate. This allows miniaturization of a printer utilizing such a recording head and a reduced load for a carriage driving system for moving the recording head with respect to a recording paper.

In addition, the heads for different colors can be obtained with uniform characteristics, ensuring high-quality recording, because plural head units, each containing heat generating elements and orifices, can be prepared with substantially the same shape and condition.

The inks to be supplied to the head units formed on a same substrate may be those of a color combination for full-collor reproduction, a so-called multi-color recording, of can be those of similar colors with different densities for a richer tonal rendition. cl EMBODIMENT OF THE PRESENT INVENTION Now the present invention will be clarified in detail by an embodiment thereof.

FIG. 1 is an exploded view of a recording head constituting a representative embodiment of the present invention. On a supporting member 101, composed for example of glass, ceramic glazed ceramic or silicon, there are formed heat-generating resistors 102, individual electrodes 103, common electrodes 104 and electrode pads 105. These resistors and electrodes are usually formed by thin film formation through vacuum evaporation or sputtering, followed by etching of unnecessary parts through known photolithographic process. The electrode pads 105 are provided for connection with unrepresented external wires for example by wire bonding. Holes 113 penetrate the substrate 115, and inks introduced from unrepresented ink reservoirs are guided through said holes 113, from the lower face of the substrate 115 to the upper face thereof bearing the heat-generating resistors 102 etc. As shown in FIG. 1, the heat generating resistors 102 are divided into plural groups in each of which said resistors are connected to a common electrode 104, and each of which is provided with a hole 113. In FIG. 1, four substantially identical and identically oriented electrode patterns each containing 7 heat generating resistors are formed on the substrate 115. On the substrate 115 there is bonded a plate 106 in a position indicated by broken-lined arrows. The plate 106 is composed for example of glass, ceramic, silicon, a metal such as stainless steel or nickel, or an organic synthetic resin. The plate 106 is provided with four groups of orifices 107 for discharging inks, each group being precisely located with respect to the others, and barriers 108 for effectively applying a pressure generated in the heat generating unit toward the orifice and avoiding the interference of pressure energy generated for liquid emission in a heat generating unit with neighboring heat generating units. Between the barriers 108 there are formed liquid paths for guiding ink to the orifices. These orifices 107, barriers 108 and liquid paths 109 are formed, respectively corresponding to the heat-generating elements, in plural groups on the plate 106, and the barriers 108 are so positioned that they are positioned in the spaces between the consecutive heat-generating resistive layer when the plate 106 is bonded according to the broken-lined arrows. A liquid chamber 110 is formed communicating with the liquid paths 109 belonging to each group. When the plate 106 is bonded to the substrate 115, the hole 113 is positioned in the bottom of each liquid chamber 110, into which the ink is introduced through said hole 113. In FIG. 1, four substantially identical, separate liquid chambers 110 are formed as recesses on the lower face of the plate 106 and are mutually separated by partitions 111. Consequently the ink introduced through a hole 113 enters a corresponding liquid chamber 110 and is guided to the liquid path 109 and orifices 107 of a group but does not mix with the inks introduced through other holes 113. The substrate 115 and the plate 106 can be bonded in various manners, but an easy and secure bonding can be achieved for example with an epoxy adhesive. The adhesive is so coated that the bonding takes place at least in the lower face of the partitions 111 and lateral walls 112.

As explained in the foregoing, the liquid-emission recording head of the present invention shown in FIG. 1 is provided with a common substrate 115, equipped with four groups of orifices 107, four ink introducing holes 113 and electrode pads 105 divided into four groups.

By introducing different color inks of yellow, magenta, cyan and black to the respective liquid chambers of the above-described recording head and providing image signals of corresponding colors to the electrode pads 105 of corresponding groups, the liquids of four colors are emitted from the orifices 107 in response to said image signals, so that four-color recording can be achieved by moving said recording head in a direction indicated by an arrow 114.

The foregoing embodiment provides a recording head capable of satisfactory image recording because the effective density of the orifices of each color is not lowered even in a full-color construction and the positional precision of orifices is extremely high.

Although the present invention has been explained by the foregoing embodiment of a multi-color recording head having four groups of orifices 107 on a same face of the substrate as shown in FIG. 1, the present invention is likewise applicable to any recording head having at least two groups of orifices 107 and two or more corresponding liquid chambers 110 and holes 113.

Also a further simplified recording head is obtained by positioning the unrepresented ink reservoirs, communicating with the liquid chambers 110 through holes 113, on a face of the substrate 115 opposite to the face thereof bearing the heat-generating resistors.

The foregoing embodiment is provided with the barriers 108 between the orifices, but the barriers can be dispensed with if the interference of liquid emitting pressure of the neighboring heat generating unit is tolerable.

As stated above, the heat generating element used in the embodiment according to the present invention has a heat generating resistive layer and at least one pair of electrodes electrically connected to the heat generating resistive layer. And, although in the foregoing explanation one of the electrodes is used as a common electrode in each of the groups, each of the electrodes way be independently provided, or one of the electrodes may be used as a common electrode in plural groups unless the one electrode is used as a common electrode in each of the groups. It is apparent that the above case can be covered with the gist of the present invention that a plurality of the element groups are independently provided.

Further, the recording liquid to be supplied is not limited to being different in color, and even if the colors of the recording liquids are substantially equal to each other, the recording liquids to be supplied may differ from each other in density. In such case, it is possible to obtain an image recorded with extremely improved graduation.

I claim:

1. A liquid jet recording apparatus comprising:

an integral substrate member including a single substrate and a plurality of substantially identical electrode patterns providing a like plurality of heat generating element groups formed directly on one side of said single substrate, each said group including the same number of plural heat generating elements for generating thermal energy and each said group having associated therewith a supplying hole for supplying a recording liquid to said heat generating elements in said group; and liquid chamber means attached to said integral substrate member to provide on said substrate a plurality of substantially identical separate liquid chambers prevented from fluid communication with each other for accommodating recording liquids having different colors or densities, each said separate liquid chamber being associated with one of said heat generating element groups and including a plurality of liquid paths, each terminating at a discharge orifice adjacent one of said heat generating elements in said associated group, so that recording liquid supplied to said liquid chamber by said supplying hole can be selectively discharged from said orifices by the thermal energy generated by said heat generating elements, wherein said plurality of patterns of electrodes are substantially identically oriented and are arranged side-by-side on said substrate whereby there is provided a like plurality of discharge orifice groups, each being associated with a corresponding said electrode pattern and being precisely located with respect to the other said discharge orifice groups.

2. A liquid jet recording head comprising:

an integral substrate member including a single substrate and a plurality of substantially identical electrode patterns providing a like plurality of heat generating element groups formed directly on one side of said single substrate, each said group including the same number of plural heat generating elements for generating thermal energy and each said group having associated therewith a supplying hole for supplying a recording liquid to said heat generating elements in said group; and liquid chamber means attached to said integral substrate member to provide on said substrate a plurality of substantially identical separate liquid chambers prevented from fluid communication with each other for accommodating recording liquids having different colors of densities, each said separate liquid chamber being associated with one of said heat generating element groups and including a plurality of liquid paths, each terminating at a discharge orifice adjacent one of said heat generating elements in said associated group, so that recording liquid supplied to said liquid chamber by said supplying hole can be selectively discharged from said orifices by the thermal energy generated by said heat generating elements, wherein said plurality of patterns of electrodes are substantially identically oriented and are arranged side-by-side on said substrate whereby there is provided a like plurality of discharge orifice groups, each being associated with a corresponding said electrode pattern and being precisely located with respect to the other said discharge orifice groups.

3. A liquid jet recording apparatus or head according to claim 1 or 2, wherein said plurality of electrode patterns, separate liquid chambers and discharge orifice groups is four in number.

4. A liquid jet recording apparatus or head according to claim 1 or 2, wherein each said discharge orifice is opposed to one of said heat generating elements.

5. A liquid jet recording apparatus or head according to claim 1 or 2, wherein a plurality of said discharge orifices are arranged in-line in each of said groups.

6. A liquid jet recording apparatus or head according to claim 1 or 2, wherein barriers are respectively provided between the discharge orifices of each of said groups.

7. A liquid jet recording apparatus or head according to claim 1 or 2, wherein said liquid chamber means comprises a common member forming all of said separate liquid chambers.

8. A liquid jet recording apparatus or head according to claim 1 or 2, wherein tanks respectively communicating to said supplying holes are provided.

9. A liquid jet recording apparatus according to claim 7, wherein said member is made of a material selected from the group consisting of glass, ceramic, silicon, metal and organic resin.

10. A liquid jet recording apparatus or head according to claim 1 or 2, wherein each of said heat generating elements has a heat generating resistive layer and at least one pair of electrodes opposing each other, which are electrically connected to said heat generating resistive layer.

11. A liquid jet recording apparatus according to claim 10, wherein at least one of said electrodes is used as a common electrode in each of said groups.

12. A liquid jet recording apparatus according to claim 10, wherein at least one of said electrodes in used as a common electrode in a plurality of said groups.

* * * * *

UNITED STATES PATENT AND TRADEMARK OFFICE

CERTIFICATE OF CORRECTION

PATENT NO. : 4,914,736

DATED : April 3, 1990

INVENTOR(S) : HIROTO MATSUDA

It is certified that error appears in the above-identified patent and that said Letters Patent is hereby corrected as shown below: Title page;

AT [56] REFERENCES CITED

U.S. Patent Documents, "Axata" should read --Ayata--.

COLUMN 1

Line 41, "further more," should read --furthermore,--.
Line 59, "(member" should read --member--.
Line 60, "such" should read --(such--.

COLUMN 2

Line 22, "black" should read --black,--
Line 26, "color." should read --colors.--.

COLUMN 3

Line 20, "portions" should read --portions,--.
Line 31, "chamber" should read --chambers--.
Line 48, "high power" should read --high resolution power--.

COLUMN 4

Line 3, "full-collor" should read --full-color--.
Line 4, "of can" should read --or can--.
Line 5, "cl EMBODI-" should be deleted.
Line 6, "MENT" should read --EMBODIMENT--.

COLUMN 5

Line 46, "way" should read --may--.

UNITED STATES PATENT AND TRADEMARK OFFICE

CERTIFICATE OF CORRECTION

PATENT NO. : 4,914,736

DATED : April 3, 1990

INVENTOR(S) : HIROTO MATSUDA

It is certified that error appears in the above-identified patent and that said Letters Patent is hereby corrected as shown below:

COLUMN 6

Line 44, "of" should read --or--.

COLUMN 7

Line 15, "liquid jet recording apparatus" should read --liquid jet recording apparatus or head--.

COLUMN 8

Line 9, "liquid jet recording apparatus" should read --liquid jet recording apparatus or head--.
Line 12, "liquid jet recording apparatus" should read --liquid jet recording apparatus or head--.

Signed and Sealed this

Twelfth Day of May, 1992

*Attest:*

DOUGLAS B. COMER

*Attesting Officer*

*Acting Commissioner of Patents and Trademarks*